United States Patent

Krivospitski et al.

[11] Patent Number: 6,002,192
[45] Date of Patent: Dec. 14, 1999

[54] DRIVE FOR TRANSPORTATION FACILITIES

[75] Inventors: Yuri Prokopevich Krivospitski; Alexei Phedorovich Avdonin, both of Kaliningrad; Sergei Ivanovich Mashurov, Mitischi-2; Leonid Stepanovich Truphanov, Schelkovo-4; Oleg Grigorievich Dashko; Anatoliy Anatolievich Atrushkevich, both of Kaliningrad; Vladimir Ivanovich Kutyanin, Kashirskoye, all of Russian Federation

[73] Assignee: Antares High Tech S.A., Chile

[21] Appl. No.: 08/793,695

[22] PCT Filed: Mar. 29, 1996

[86] PCT No.: PCT/RU96/00074

§ 371 Date: Aug. 8, 1997

§ 102(e) Date: Aug. 8, 1997

[87] PCT Pub. No.: WO97/01379

PCT Pub. Date: Jan. 16, 1997

[30] Foreign Application Priority Data

Jun. 29, 1995 [RU] Russian Federation .............. 95110042

[51] Int. Cl.$^6$ ...................................................... H02K 1/22
[52] U.S. Cl. .................... 310/266; 310/67 R; 310/68 R; 310/254; 310/266; 310/67 A; 310/66
[58] Field of Search ................................ 310/67 R, 68 R, 310/254, 266, 67 A, 66

[56] References Cited

U.S. PATENT DOCUMENTS

| | | | |
|---|---|---|---|
| 3,396,296 | 8/1968 | Esters | 310/266 |
| 3,538,364 | 11/1970 | Favereau | 310/266 |
| 4,073,356 | 2/1978 | Schlicht . | |
| 4,731,554 | 3/1988 | Hall et al. | 310/67 R |
| 4,900,965 | 2/1990 | Fisher | 310/216 |
| 5,236,058 | 8/1993 | Yamet et al. . | |
| 5,330,026 | 7/1994 | Hau et al. . | |
| 5,554,903 | 9/1996 | Takara | 310/266 |

FOREIGN PATENT DOCUMENTS 2653348  10/1989  France .

*Primary Examiner*—Elvin G. Enad
*Attorney, Agent, or Firm*—Rothwell, Figg, Ernst & Kurz, P.C.

[57] ABSTRACT

A drive unit for transport devices comprises a spindle (1) with a stator (2) and, mounted on said spindle so as to be capable of rotation, a rotor (3), all these elements forming an electric motor (4) and a rim (5). The device is provided with permanent magnets (6, 7, 8, 9), cores (10) with coils (11), and sensors (12) for determining the angular position of the rotor (3). The rotor (3) is designed as concentric shells (13,14) and joined to the rim (5). The permanent magnets (6, 7, 8, 9) are mounted on the sleeves (13, 14), each magnet facing another magnet of opposite polarity; on each sleeve (13, 14) permanent magnets (6, 7, 8, 9) are mounted so that their polarity alternates. The stator (2) is located between the permanent magnets (6, 7, 8, 9) and carries the coils (11) with cores (10), the coils being connected around the periphery to the stator (2) and arranged with gaps between themselves and the permanent magnets (6, 7, 8, 9).

2 Claims, 2 Drawing Sheets

DRIVE FOR TRANSPORTATION FACILITIES

TECHNICAL FIELD

The present invention relates in general to drives for transportation facilities, in particular, for actuating roller-mounted platforms, invalid wheelchairs, and the like.

BACKGROUND ART

Known in the present state of the art is a drive for transportation facilities, comprising an axle with a stator, a rotor fitted rotatably on said axle, to form an electric motor, and a rim (cf. U.S. Pat. No. 5,330,026, Cl. A63C 17/12, 1994).

However, the known drive is but of low efficiency.

DISCLOSURE OF THE INVENTION

The present invention has for its principal object to provide a drive for transportation facilities which allows of bettering the starting characteristics of said facilities.

The essence of the present invention resides in that the drive has permanent magnets, cores with coils, and rotor angular position transducers. The rotor appears as concentric shells and is connected to the rim; the permanent magnets are arranged on the shells one against the other facing each other with their opposite poles; on each shell the permanent magnets are arranged with alternating polarity; the stator is interposed between the permanent magnets and carries coils with cores, said coils being peripherally connected to the stator and being arranged in a spaced relation to the permanent magnets; the rotor angular position transducers are held in place on the stator and are electrically connected to the coils which are assembled into a winding having two or more phases subdivided into phase zones having n coils belonging to the same phase, where n=1, 2, 3 . . . the coils of phase zones or of all phases are spaced apart with a pitch differing from the pitch with which the permanent magnets are arranged by a value equal to $\alpha/n-1 \ldots \alpha/n$, where $\alpha$ denotes an angular width of the magnet-to-magnet gap; the rotor angular position transducers are interposed between the cores, one transducer per phase, in such a manner that with 'n' being an even number, the transducers are located on the stator outside facing the permanent magnets and along the axes of the phase zones, and with 'n' being an odd number, the transducers are displaced for an angle multiple of half the angular pitch of the permanent magnets with respect to the axes of the phase zones.

It is expedient that the shells are made of a soft magnetic material.

Practical use of the present invention will help increase its efficiency due to improved starting characteristics thereof.

BRIEF DESCRIPTION OF THE DRAWINGS

In what follows the present invention will now be disclosed in a detailed description of an illustrative embodiment thereof with reference to the accompanying drawings, wherein.

BEST METHOD OF CARRYING OUT THE INVENTION

Figure 1:
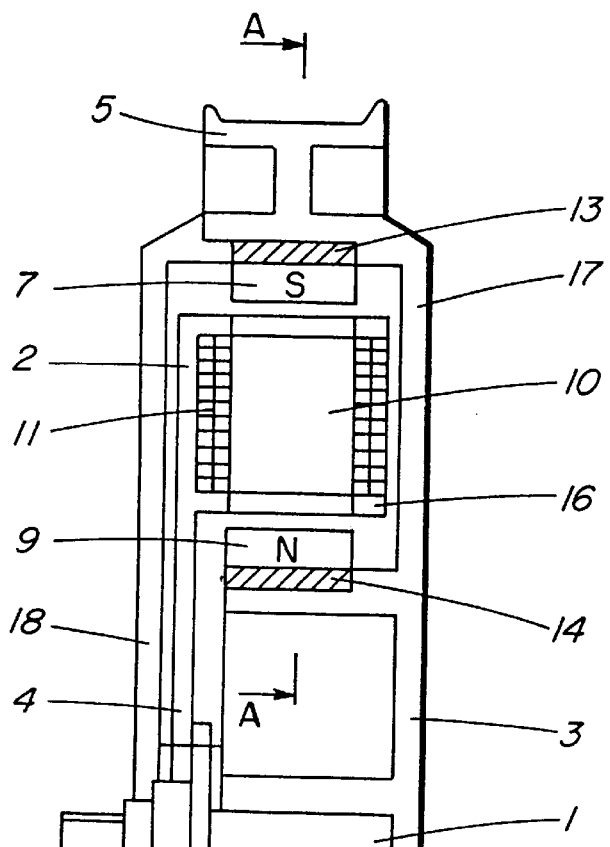
FIG. 1 is a sectional view of the drive, according to the invention.

The drive for transportation facilities comprises an axle 1 with a stator 2 and a rotor 3 set rotatably on said axle to form an electric motor 4, and a rim 5 (FIG. 1).

Figure 2:
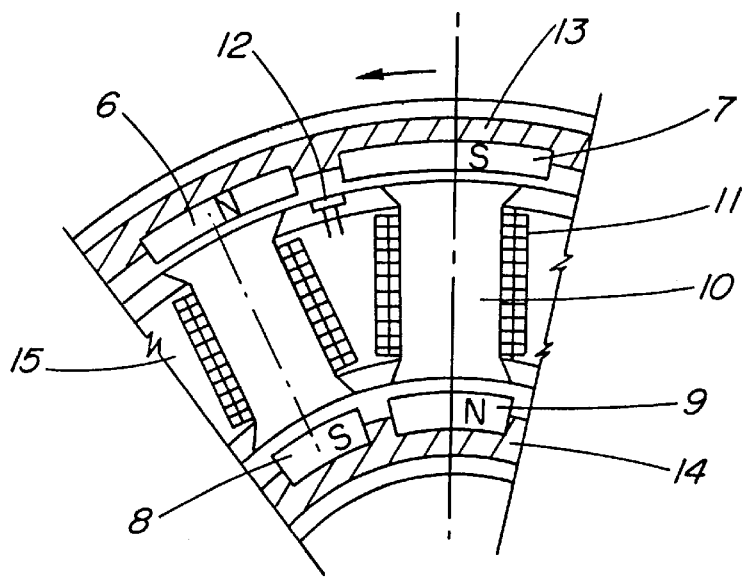
FIG. 2 is a section taken on the line A—A, according to the invention.

The drive has permanent magnets 6, 7, 8, and 9, cores 10 with coils 11, transducers 12 of angular position of the rotor 3, each of said transducers consisting of, e.g., two magnetosensitive Hall generators (FIGS. 1, 2).

The rotor 3 appears as concentric shells 13, 14 made of a soft magnetic material and is connected to a rim 5.

The permanent magnets 6, 7, 8, and 9 are arranged on the shells 13, 14 one against the other facing each other with their opposite poles; on each shell 13, 14 the permanent magnets 6, 7, 8, 9 are arranged with alternating polarity.

The stator 2 is interposed between the permanent magnets 6, 7, 8, and 9 and carries the coils 11 with the cores 10, said coils being peripherally connected to the stator 2 and being arranged in a spaced relation to the permanent magnets 6, 7, 8, and 9.

The rotor angular position transducers 12 are held in place on the stator 2 and are electrically connected to the coils 11.

The coils 11 are assembled into a winding 15 having two or more phases subdivided into phase zones with n coils belonging to the same phase, where n=1, 2, 3 . . . the coils 11 of phase zones or of all phases are spaced apart with a pitch differing from the pitch with which the permanent magnets 6, 7, 8, and 9 are arranged by a value equal to $\alpha/n-1 \ldots \alpha/n$, where $\alpha$ denotes an angular width of a gap between the magnets 6, 7, 8, and 9; the rotor angular position transducers 12 are interposed between the cores 10, one transducer per phase, in such a manner that with 'n' being an even number, the transducers are located on the stator outside facing the permanent magnets 6, 7, 8, and 9 and along the axes of the phase zone, and with 'n' being an odd number, the transducers are displaced for an angle multiple of half the angular pitch of the permanent magnets 6, 7, 8, and 9 with respect to the axes of the phase zones.

The shells 13 and 14 are made of a soft magnetic material. The cores 10 with the stator 2 are held to straps 16. The shells 13, 14 are interconnected through a nonmagnetic wall 17. The rotor 3 is closed with a cover 18.

The transducers 12 are electrically connected to a commutator (not shown) and the coils 11, and are controlled by the magnetic field of the permanent magnets 6 and 7.

When the N-polarity magnet 6 passes over the transducer 12, this induces a current flowing in one direction along the coils 11 of one phase, and when the S-polarity magnet 7 passes over said transducer, a current is induced to flow in the reverse direction along said coils 11 of the same phase. When a magnetic gap passes over the transducer 12 the latter is turned off. The spacing between the adjacent permanent magnets 6 and 7 should be as small as possible but should exceed a radial clearance between the stator 2 and the magnets 6, 7 of the rotor 3 four or more times. It is reasonable to change over the coils 11 at the instant when the middle portion of the permanent magnets passes thereover, i.e., when the tangential components of the magnetic interaction forces are minimal and the radial components are at maximum.

Figure 3:
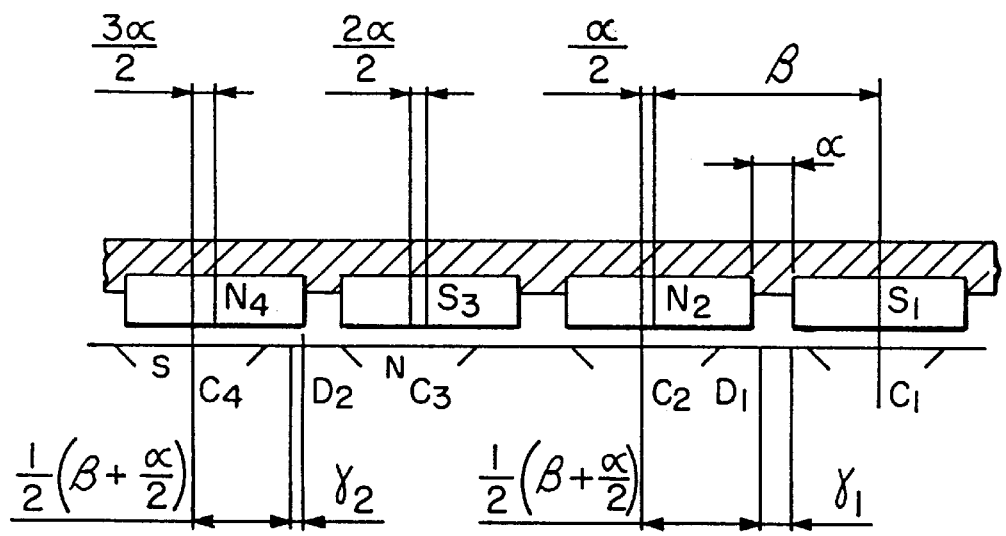
FIGS. 3 and 4 present a partially developed view of the rotor and of the stator cores with reference to two phase zones of the stator winding, with n=2 and n=3, according to the invention.

With "n" having an even value, e.g., n=2 (FIG. 3), an optimum position of the transducer D1 is on the axis of symmetry of the phase zone. In this particular case $\Delta\beta = \alpha/n-1 \ldots \alpha/n = \alpha/1 \ldots \alpha/2$. Assume $\Delta\beta = \alpha/2$ whence the pitch of the cores 10 equals $\beta+\alpha/2$, and the transducer D1 makes up an angle equal to $\frac{1}{2}\cdot(\beta+\alpha/2)$ with the cores C1 and C2, $\gamma_1 = \gamma_2 = \frac{3}{4}\cdot\alpha$.

Figure 4:
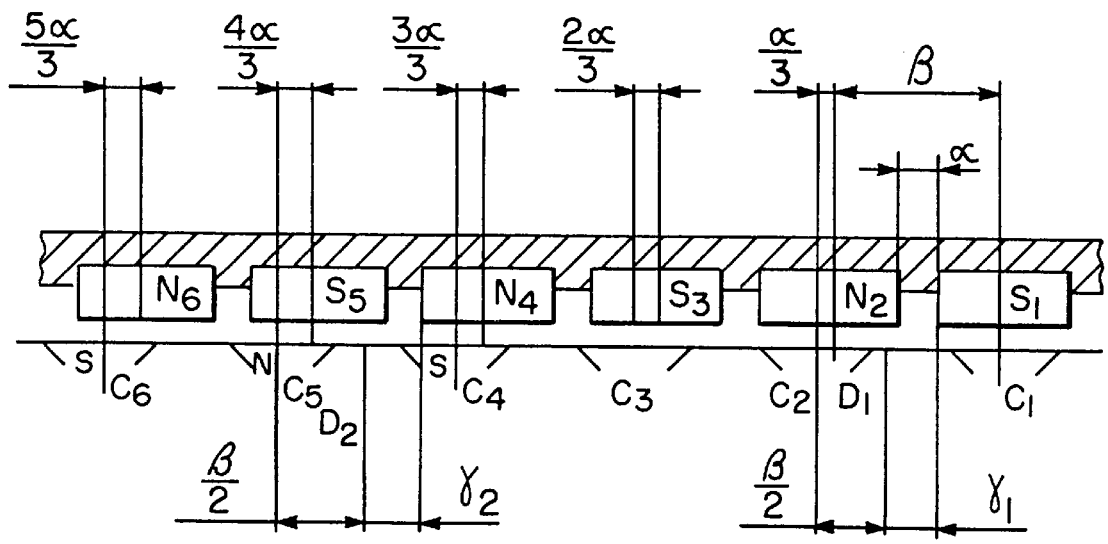

When the magnitude of said angle is above or below $\frac{1}{2}\cdot(\beta+\alpha/2)$ the deenergizing zone of the coils of the cores C1, C2 is displaced relative to the axes of the magnets S1, N2, which reduces the torque value. As can be seen from FIG. 3, the transducer D2 is turned off as soon as the transducer ä1 is turned on. This is the limiting case. With $\Delta\beta<\alpha/2$ the transducer D2 is turned off when the transducer D1 has not yet been turned on, with the result that the torque value drops down to zero. With $\Delta\beta>\alpha/2$ the transducer D2 is turned on when the middle portion of the magnets N2, N4 has not yet passed over the axes of the cores C2, C4. Thus, the currents induced in the cores C2, C4 flow in the direction opposite to the currents passing along the cores C1, C3, whereby the torque value is reduced, too. With "n" having an even value, e.g., n=3 (FIG. 4), the transducer D1 or D2 assumes an optimum position when it is displaced by half the pitch value ($\beta/2$) of the permanent magnets relative to the axis of the phase zone.

Now let us calculate the value of $\Delta\beta=\alpha/n-1 \ldots \alpha/n = \alpha/2 \ldots \alpha/3$. Assuming $\Delta\beta=\alpha/3$, we determine the position of the transducer ä1 relative to the magnet S1, that is, $\gamma_1=\beta+\alpha/3-\alpha/2-(\beta-\alpha)/2= \frac{5}{6}\cdot\alpha$. The position of the transducer D1 may be at any angle multiple of $\beta/2$ in any direction.

The number of phases must be two or more. In the case of a single-phase winding the torque is liable to fluctuate so that the position of the rotor 3 relative to the stator 2 with a reduced torque value. Though an increased number of phases helps in improving the starting characteristics and increasing the minimum torque value, it leads also to an increased number of transducers and sophisticates the commutation system; so a maximum number of phases is to be assumed five.

The number of phase zone in each phase determines the ratio between the number of permanent magnets in a set and the number of coils per winding.

The number of coils depends on the power output and is other than the number of permanent magnets in a set.

The herein-proposed drive for transportation facilities functions as follows.

The drive having been energized, a signal is delivered from the transducer D2 (FIG. 3) located underneath the permanent magnet N4, to the commutator which energizes the coils 4 of the cores C3 and C4 and the rest of the coils of this phase. Thus, magnetic fields are induced in the cores C3, C4, which fields interact with the permanent magnets S3, N4 to move the rotor 3 in the direction indicated with an arrow. When the edge of the magnet N4 is passing over the transducer D2, the coils of the cores get deenergized until the edge of the magnet S3 stands over the transducer D2, which magnet, while moving further, energizes the transducer D2, with the result that a current flows along the coils of the cores C3, C4, thus inducing opposite-polarity magnetic fields therein. Now the magnets N4, S3 are repelled from the cores C3, C4, thus causing the rotor 3 to move in the same direction. The cycle is repeated in all the phase zones, whereby the rotor 3 is given continuous rotation.

The greater the number of phases the lesser number of coils are in the deenergized state and hence the lower the variation of the torque value.

Use of a polyphase winding divided into phase zones and changing-over of coils in the phase zones as close as possible to the middle portion of the permanent magnets also helps increasing the efficiency of the drive, reducing torque fluctuation, and improving the starting characteristics of the drive.

The herein-proposed construction is instrumental in providing a low-speed gearless high-efficiency (up to 80%) electric motor.

INDUSTRIAL APPLICABILITY

The present invention can find application for the manufacture of roller-mounted platforms, invalid wheelchairs, and motorized wheels that make part of both.

We claim:

1. A drive for transportation facilities, comprising an axle (1) with a stator (2) and a rotor (3) set rotatably on said axle to form an electric motor (4), and a rim (5), CHARACTERIZED in that it has permanent magnets (6, 7, 8, and 9), cores (10) with coils (11), and transducers (12) of angular position of the rotor (3); the rotor (3) comprises concentric shells (13, 14) and is connected to the rim (5); the permanent magnets (6, 7, 8, and 9) are arranged on the shells (13, 14) one against the other so as to face each other with their opposite poles; on each shell (13, 14) the permanent magnets (6, 7, 8, and 9) are arranged with alternating polarity; the stator (2) is interposed between the permanent magnets (6, 7, 8, and 9) and carries the coils (11) with the cores (10), said coils peripherally connected to the stator (2) and arranged in a spaced relation to the permanent magnets (6, 7, 8, and 9); the rotor angular position transducers (12) are held in place on the stator (2) and are electrically connected to the coils (11) which are assembled into a winding (15) with two or more phases subdivided into phase zones having n coils which belong to the same phase, where n=1, 2, 3 . . . ; the coils (11) within the phase zones or all phases are spaced apart with a pitch differing from the pitch with which the permanent magnets (6, 7, 8, and 9) are arranged by a value equal to $\alpha/n-1 \ldots \alpha/n$, where $\alpha$ denotes an angular width of a gap between the magnets (6, 7, 8, and 9) and the rotor angular position transducers (12) are interposed between the cores (10), one transducer per phase, in such a manner that with 'n' being an even number, the transducers (12) are located on the outside of the stator (2) facing the permanent magnets (6, 7, 8, and 9) and along the axes of the phase zones, and with 'n' being an odd number, the transducers (12) are displaced for an angle multiple of half the angular pitch of the permanent magnets (6, 7, 8, and 9) with respect to the axes of the phase zones.

2. A drive as set forth in claim 1, CHARACTERIZED in that the cores (10) and the shells (13, 14) are made of a soft magnetic material.

* * * * *